(12) United States Patent
Daido et al.

(10) Patent No.: US 11,295,723 B2
(45) Date of Patent: Apr. 5, 2022

(54) VOICE SYNTHESIS METHOD, VOICE SYNTHESIS APPARATUS, AND RECORDING MEDIUM

(71) Applicant: YAMAHA CORPORATION, Hamamatsu (JP)

(72) Inventors: Ryunosuke Daido, Hamamatsu (JP); Masahiro Shimizu, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 0 days.

(21) Appl. No.: 16/885,827

(22) Filed: May 28, 2020

(65) Prior Publication Data

US 2020/0294486 A1 Sep. 17, 2020

Related U.S. Application Data

(63) Continuation of application No. PCT/JP2018/043656, filed on Nov. 28, 2018.

(30) Foreign Application Priority Data

Nov. 29, 2017 (JP) .............................. JP2017-229041

(51) Int. Cl.
*G10L 13/04* (2013.01)
*G10L 25/30* (2013.01)
*G10L 25/93* (2013.01)

(52) U.S. Cl.
CPC .............. *G10L 13/04* (2013.01); *G10L 25/30* (2013.01); *G10L 25/93* (2013.01)

(58) Field of Classification Search
CPC .......... G10L 13/04; G10L 25/30; G10L 25/93
(Continued)

(56) References Cited

U.S. PATENT DOCUMENTS

2001/0023396 A1* 9/2001 Gersho ................... G10L 19/18
704/220
2005/0065781 A1* 3/2005 Tell ......................... G10L 19/02
704/203
(Continued)

FOREIGN PATENT DOCUMENTS

JP 2006084967 A 3/2006

OTHER PUBLICATIONS

Y. Stylianou, "Applying the harmonic plus noise model in concatenative speech synthesis," in IEEE Transactions on Speech and Audio Processing, vol. 9, No. 1, pp. 21-29, Jan. 2001, doi: 10.1109/89.890068. (Year: 2001).*

(Continued)

*Primary Examiner* — Bharatkumar S Shah
(74) *Attorney, Agent, or Firm* — Rossi, Kimms & McDowell LLP

(57) ABSTRACT

A voice synthesis method includes: supplying a first trained model with control data including phonetic identifier data to generate a series of frequency spectra of harmonic components; supplying a second trained model with the control data to generate a waveform signal representative of non-harmonic components; and generating a voice signal including the harmonic components and the non-harmonic components based on the series of frequency spectra of the harmonic components generated by the first trained model and the waveform signal representative of the non-harmonic components generated by the second trained model.

10 Claims, 3 Drawing Sheets

(58) Field of Classification Search
USPC .......................................................... 704/259
See application file for complete search history.

(56) References Cited

U.S. PATENT DOCUMENTS

2006/0069567 A1* 3/2006 Tischer ................. G10L 13/033
704/260
2013/0262098 A1* 10/2013 Kim ........................ G10L 25/90
704/208

OTHER PUBLICATIONS

Y. Stylianou, "Applying the harmonic plus noise model in concatenative speech synthesis," in IEEE Transactions on Speech and Audio Processing, vol. 9, No. 1, pp. 21-29, Jan. 2001, doi: 10.1109/89.890068. (Year: 2001) (Year: 2001).*
Y. Stylianou, "Applying the harmonic plus noise model in concatenative speech synthesis," in IEEE Transactions on Speech and Audio Processing, vol. 9, No. 1, pp. 21-29, Jan. 2001, doi: 10.1109/89.890068. (Year: 2001) (Year: 2001) (Year: 2001).*
International Search Report issued in Intl. Appln. No. PCT/JP2018/043656 dated Feb. 12, 2019. English translation provided.
Written Opinion issued in Intl. Appln. No. PCT/JP2018/043656 dated Feb. 12, 2019.
Blaauw. "A Neural Parametric Singing Synthesizer." INTERSPEECH 2017. arXiv:1704.03809v3 [cs.SD] Aug. 17, 2017: 1-9.
Van Den Oord. "WaveNet: A Generative Model for Raw Audio." arXiv:1609.03499v2 [cs.SD] Sep. 19, 2016. pp. 1-15.

* cited by examiner

VOICE SYNTHESIS METHOD, VOICE SYNTHESIS APPARATUS, AND RECORDING MEDIUM

CROSS REFERENCE TO RELATED APPLICATIONS

This application is a Continuation Application of PCT Application No. PCT/JP2018/043656, filed Nov. 28, 2018, and is based on and claims priority from Japanese Patent Application No. 2017-229041, filed Nov. 29, 2017, the entire contents of each of which are incorporated herein by reference.

BACKGROUND

Technical Field

The present disclosure relates to a technique for synthesizing a voice.

Description of Related Art

Various voice synthesis techniques for synthesizing a voice expressive of phonetic identifiers are known. For example, Non-Patent Document 1 discloses a technique for synthesizing a singing voice using a neural network. In the technique disclosed in Merlijn Blaauw, Jordi Bonada, "A NEURAL PARAMETRIC SINGING SYNTHESIZER," arXiv, 12 Apr. 2017 (hereafter, "Non-Patent Document 1"), control data indicative of a pitch, a phonetic identifier, and a sound duration for each of notes of a song are input to the neural network, whereby a series of frequency spectra of harmonic components and a series of frequency spectra of non-harmonic components are generated. The frequency spectra of the harmonic components and the frequency spectra of the non-harmonic components are then synthesized, whereby a time-domain voice signal representing the waveform of the singing voice is generated.

The technique described in Non-Patent Document 1 has a drawback in that although by use of the technique it is possible to generate a natural sounding voice for harmonic components of a singing voice, it is difficult to generate a natural sounding voice for non-harmonic components, such as breathing components, fricative sounds, and so forth.

SUMMARY

In view of the above circumstances, it is an object of the present disclosure to generate a natural voice that is close to a real human voice both in harmonic components and non-harmonic components.

In one aspect, a voice synthesis method includes: supplying a first trained model with control data including phonetic identifier data to generate a series of frequency spectra of harmonic components; supplying a second trained model with the control data to generate a waveform signal representative of non-harmonic components; and generating a voice signal including the harmonic components and the non-harmonic components based on the series of frequency spectra of the harmonic components generated by the first trained model and the waveform signal representative of the non-harmonic components generated by the second trained model.

In another aspect, a voice synthesis apparatus includes: a first trained model configured to generate a series of frequency spectra of harmonic components according to control data including phonetic identifier data; a second trained model configured to generate a waveform signal representative of non-harmonic components according to the control data; and a synthesis processor configured to generate a voice signal including the harmonic components and the non-harmonic components based on the series of frequency spectra of the harmonic components generated by the first trained model and the waveform signal representative of the non-harmonic components generated by the second trained model.

In still another aspect, a non-transitory computer-readable recording medium has recorded thereon a computer program for causing a computer to perform a voice synthesis method of: supplying a first trained model with control data including phonetic identifier data to generate a series of frequency spectra of harmonic components; supplying a second trained model with the control data to generate a waveform signal representative of non-harmonic components; and generating a voice signal including the harmonic components and the non-harmonic components based on the series of frequency spectra of the harmonic components generated by the first trained model and the waveform signal representative of the non-harmonic components generated by the second trained model.

DESCRIPTION OF THE EMBODIMENTS

First Embodiment

Figure 1:
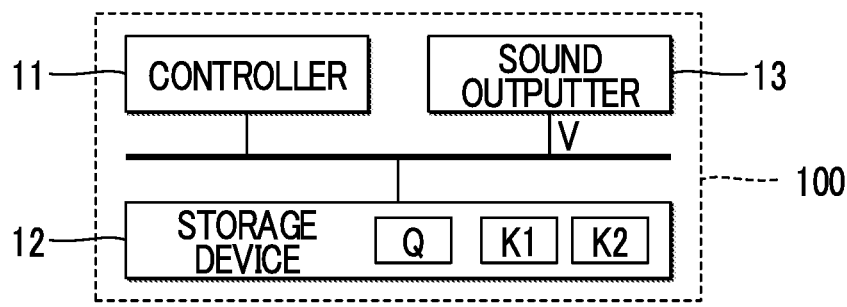
FIG. 1 is a block diagram illustrating a configuration of a voice synthesis apparatus according to a first embodiment of the present disclosure.

FIG. 1 is a block diagram illustrating an example of a configuration of a voice synthesis apparatus 100 according to a first embodiment of the present disclosure. The voice synthesis apparatus 100 in the first embodiment is a singing synthesis apparatus that synthesizes a voice (hereafter, "voice to be synthesized"), which is obtained when a singer sings a song virtually. As illustrated in FIG. 1, the voice synthesis apparatus 100 is realized by a computer system including a controller 11, a storage device 12, and a sound outputter 13. For example, a portable information terminal such as a mobile phone or a smartphone, or a portable or stationary information terminal, such as a personal computer, can be preferably used as the voice synthesis apparatus 100.

The controller 11 is, for example, processing circuitry such as a CPU (Central Processing Unit) and controls overall components constituting the voice synthesis apparatus 100. The controller 11 in the first embodiment generates a time-domain voice signal V representing the waveform of the voice to be synthesized. The sound outputter 13

(for example, a loudspeaker or a headphone) reproduces a voice that is represented by the voice signal V generated by the controller 11. For convenience, illustrations are omitted of a digital-to-analog converter that converts the voice signal V generated by the controller 11 from a digital signal to an analog signal, and an amplifier that amplifies the voice signal V. Although the configuration in which the sound outputter 13 is mounted on the voice synthesis apparatus 100 is illustrated in FIG. 1, the sound outputter 13 separate from the voice synthesis apparatus 100 may be connected either wired or wirelessly to the voice synthesis apparatus 100.

The storage device 12 is constituted of, for example, a known recording medium such as a magnetic recording medium or a semiconductor recording medium, or a combination of types of recording media, and has stored therein a computer program executed by the controller 11 and various types of data used by the controller 11. The storage device 12 (for example, a cloud storage) may be provided separate from the voice synthesis apparatus 100 to enable the controller 11 to write to and read from the storage device 12 via a communication network, such as a mobile communication network or the Internet. That is, the storage device 12 may be omitted from the voice synthesis apparatus 100.

The storage device 12 has stored therein song data Q representative of content of a song. The song data Q in the first embodiment are indicative of a pitch, a phonetic identifier, and a sound period with respect to each of notes constituting the song. The pitches are, for example, MIDI (Musical Instrument Digital Interface) note numbers. The phonetic identifiers are contents vocalized by the voice to be synthesized (that is, lyrics of the song). The sound period is a period in which each note of the song is vocalized and can be specified as, for example, a start point of a note and an end point of the note, or as the start point of the note and the duration of the note. The song data Q in the first embodiment are indicative of musical expressions of the voice to be synthesized. For example, musical expressions such as intensity of phonation (for example, forte), increase/decrease of the intensity (for example, crescendo/decrescendo), singing expressions (for example, vibrato), or voice quality (for example, a hoarseness) are indicated by the song data Q.

Figure 2:
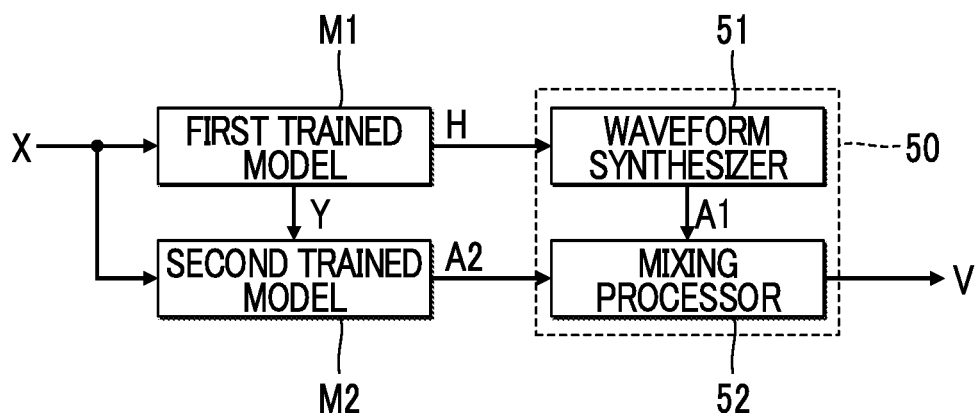
FIG. 2 is a block diagram illustrating a functional configuration of the voice synthesis apparatus.

FIG. 2 is a block diagram illustrating an example of a functional configuration of the controller 11. As illustrated in FIG. 2, the controller 11 realizes functions (a first trained model M1, a second trained model M2, and a synthesis processor 50) for generating the time-domain voice signal V representative of the waveform of a synthesized voice of a specified singer (hereafter, "specific singer") by executing a computer program stored in the storage device 12. The functions of the controller 11 may be realized by a set of apparatuses (that is, a system). Alternatively, some or all of the functions of the controller 11 may be realized by dedicated electronic circuitry (for example, signal processing circuitry).

The first trained model M1 is a statistical model that generates a series of frequency spectra (hereafter, "harmonic spectra") H of harmonic components in the voice to be synthesized of the specific singer, and is defined by coefficients K1 stored in the storage device 12. The harmonic components are periodic components that include a harmonic structure (an overtone structure) consisting of a fundamental tone component of a fundamental frequency and overtone components of frequencies of integer multiples. The first trained model M1 sequentially generates a harmonic spectrum H for each first unit period (that is, each frame). For example, a harmonic spectrum H is generated every 5 milliseconds.

Figure 3:
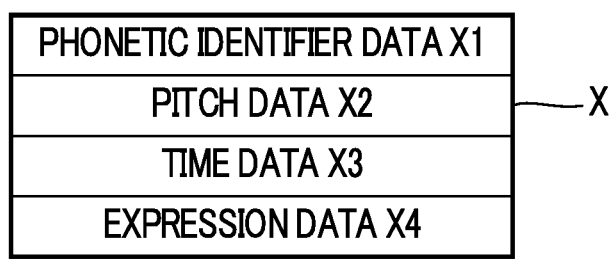
FIG. 3 is a schematic diagram of control data X.

Specifically, the first trained model M1 may be a neural network (typically, a deep neural network) that sequentially outputs one-by-one the harmonic spectra H corresponding to the song data Q. More specifically, the first trained model M1 may be a convolutional neural network (CNN) where a receptive field for harmonic spectra is expanded using a Dilated Convolution method and a Residual Network (ResNet) method. The first trained model M1 in the first embodiment outputs, for each first unit period (each frame), a harmonic spectrum H according to input of control data X prepared based on the song data Q and harmonic spectra H generated by the first trained model M1 for immediately preceding first unit periods. The control data X are indicative of content of the voice to be synthesized and is generated for each of time points (hereafter, "control time points") on a time axis. The control time point is one that is provided on the time axis for each first unit period. The control data X can be configured to include phonetic identifier data X1, pitch data X2, time data X3, and expression data X4, as illustrated in FIG. 3.

The phonetic identifier data X1 are data on phonetic identifiers of the voice to be synthesized. Specifically, the phonetic identifier data X1 are indicative of, for example, a phonetic identifier of a phoneme(s) that is at a control time point, a phonetic identifier of a phoneme(s) immediately before the phoneme(s) at the control time point, and a phonetic identifier of a phoneme(s) immediately after the phoneme(s) at the control time point. The pitch data X2 are data on a pitch of the voice to be synthesized. Specifically, the pitch data X2 are indicative of, for example, a pitch of a note at the control time point, a pitch of a note immediately before the note at the control time point, and a pitch of a note immediately after the note at the control time point. The time data X3 are indicative of, for example, a position of the control time point within a phoneme. The expression data X4 comprise a musical expression at the control time point. Alternatively, the phonetic identifier data X1 may be indicative of the phonetic identifier of only one phoneme at the control time point, or the pitch data X2 indicative of the pitch of only one note at the control time point may be used.

The first trained model M1 for the specific singer has been trained through machine learning (deep learning) using teacher data L1 on the specific singer, so as to be a trained model having learned relations between control data X and temporal changes of the harmonic spectra H. In the teacher data L1, control data X and harmonic spectra H are associated with each other. That is, coefficients K1 that define the first trained model M1 are set through the machine learning using the teacher data L1 and are stored in the storage device 22. Thus, a series of harmonic spectra H that is adequate for unknown control data X under a tendency extracted from the teacher data L1 of the specific singer (the relation between control data X and harmonic spectra H) is output by the first trained model M1 of the specific singer. The machine learning using the teacher data L1 will be explained later. As will be understood from the above explanations, a series of the harmonic spectra H corresponding to harmonic components of a voice to be synthesized is generated, where the voice to be synthesized is a vocal rendition of the phonetic identifiers indicated by the phonetic identifier data X1 sung virtually by the specific singer at the pitches indicated by the pitch data X2 and with the expressions indicated by the expression data X4. A neural network that generates harmonic spectra H is described in, for example, Non-Patent Document 1.

The second trained model M2 is a statistical model that generates a time-domain audio signal (hereafter, "non-harmonic signal") A2 representing a waveform of non-harmonic components in the voice to be synthesized of the specific singer, and is defined by coefficients K2 stored in the storage device 12. The non-harmonic components are aperiodic components other than harmonic components and are acoustic components that characterize an auditory impression of the voice quality, such as thickness and hoarseness. The non-harmonic signal A2 is represented by a series of waveform samples of non-harmonic components in the time domain (that is, samples each representing the signal intensity for each second unit period). The non-harmonic signal A2 is an example of the waveform signal representative of the non-harmonic components. The second trained model M2 sequentially generates one-by-one a sample of the non-harmonic signal A2 for each second unit period (that is, each sampling period). The second unit period is shorter than the first unit period. For example, a sample of the non-harmonic signal A2 is generated every 0.05 millisecond.

Specifically, the second trained model M2 may be a neural network (typically, a deep neural network) that outputs each sample of the non-harmonic signal A2 corresponding to the control data X. More specifically, the second trained model M2 may be a convolutional neural network (CNN) where a receptive field for the non-harmonic signal A2 is expanded using a Dilated Convolution method and a Residual Network (ResNet) method. The second trained model M2 in the first embodiment outputs, for each second unit period (each sampling period), a sample of the non-harmonic signal A2 in the current second unit period according to input of the control data X according to the song data Q, auxiliary data Y indicative of a processing result of the first trained model M1, and a series of samples of the non-harmonic signal A2 generated by the second trained model M2 for immediately preceding second unit periods. A neural network that generates samples representing the waveform in the time domain is disclosed in, for example, "WaveNet: A Generative Model for Raw Audio", Oord et al., arXiv 19 Sep. 2016.

The auxiliary data Y are generated for each control time point, similarly to the control data X. The auxiliary data Y in the first embodiment include a fundamental frequency (pitch) Y1 output by the first trained model M1 in relation to the harmonic spectrum H, and a result (hereafter, "voiced/unvoiced determination result") Y2 of voiced/unvoiced determination made on the basis of the harmonic spectrum H. The voiced/unvoiced determination result Y2 is a result of a determination on whether the harmonic spectrum H includes a definite harmonic structure (whether a significant fundamental frequency Y1 can be definitely specified from the harmonic spectrum H).

The second trained model M2 of the specific singer has been trained through machine learning (deep learning) using teacher data L2 on the specific singer, so as to be a trained model having learned relations between control data X and auxiliary data Y, and temporal changes of the non-harmonic signal A2 (specifically, a series of samples of the non-harmonic signal A2). In the teacher data L2, the control data X and auxiliary data Y, and the non-harmonic signal A2 are associated with each other. That is, coefficients K2 that define the second trained model M2 are established through the machine learning using the teacher data L2 and are stored in the storage device 12. Thus, a series of samples of the non-harmonic signal A2 that is adequate for unknown control data X and auxiliary data Y under a tendency extracted from the teacher data L2 (the relation between control data X and auxiliary data Y, and a non-harmonic signal A2) is output by the second trained model M2. The machine learning using the teacher data L2 will be described later. As will be understood from the above explanations, the non-harmonic signal A2 corresponding to non-harmonic components of a voice to be synthesized is generated, where the voice to be synthesized is a vocal rendition of the phonetic identifiers indicated by the phonetic identifier data X1 sung virtually by the specific singer at the pitches indicated by the pitch data X2 and with the expressions indicated by the expression data X4.

In the first embodiment, the fundamental frequency Y1 of the harmonic spectrum H is input to the second trained model M2. Therefore, a sample of the non-harmonic signal A2 changes according to the change in the fundamental input frequency Y1. For example, even in a case where the second trained model M2 is supplied with the same control data X (and the voiced/unvoiced determination results Y2), the second trained model M2 generates non-harmonic signals A2 having different acoustic characteristics if the supplied fundamental frequency Y1 is different. Further, since the voiced/unvoiced determination result Y2 is input to the second trained model M2, a sample of the non-harmonic signal A2 changes according to the change in the voiced/unvoiced determination result Y2. For example, even in a case where the second trained model M2 is supplied with the same control data X (and the fundamental frequencies Y1), the second trained model M2 may generate non-harmonic signals A2 having different acoustic characteristics if the voiced/unvoiced determination result Y2 is different. The second trained model M2 may be a model that accepts as input only one of the fundamental frequency Y1 and the voiced/unvoiced determination result Y2 without accepting the other thereof as input.

The synthesis processor 50 in FIG. 2 generates the voice signal V including the harmonic components and the non-harmonic components based on the series of the harmonic spectra H generated by the first trained model M1 and the non-harmonic signal A2 generated by the second trained model M2. The synthesis processor 50 in the first embodiment includes a waveform synthesizer 51 and a mixing processor 52 as illustrated in FIG. 2.

The waveform synthesizer 51 generates, for each second unit period (for each sampling period), a sample of a time-domain audio signal (hereafter, "harmonic signal") A1 based on the series of the harmonic spectra H generated by the first trained model M1. For example, any known vocoder technique can be adopted for generation of the harmonic signal A1. The mixing processor 52 mixes for each second unit period a sample of the harmonic signal A1 generated by the waveform synthesizer 51 and a sample of the non-harmonic signal A2 generated by the second trained model M2, to generate a time-domain sample of the voice signal V. For example, an adder that adds the harmonic signal A1 and the non-harmonic signal A2 is suitable as the mixing processor 52. The mixing ratio of the harmonic signal A1 and the non-harmonic signal A2 may be changed, for example, according to an instruction made by a user. As will be understood from the above explanations, the generated voice signal V is representative of the voice to be synthesized, which is a singing voice by a specific singer singing the song virtually indicated by the song data Q. The voice signal V generated by the synthesis processor 50 (the mixing processor 52) is supplied to the sound outputter 13 and is reproduced as sound waves.

Figure 4:
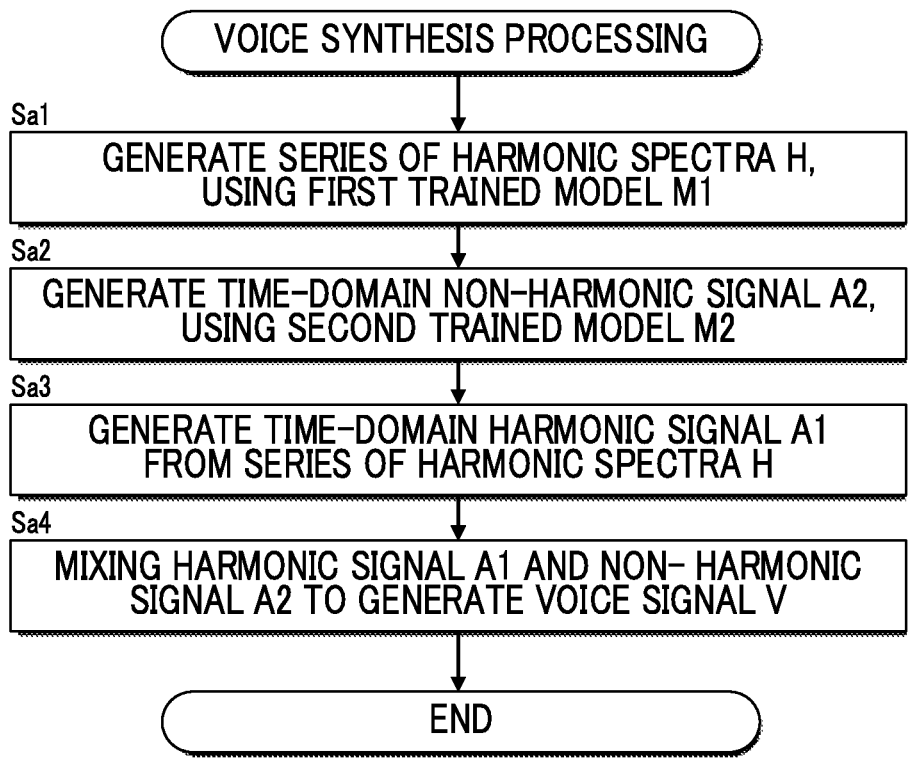
FIG. 4 is a flowchart of voice synthesis processing.

FIG. 4 is a flowchart of processing (hereafter, "voice synthesis processing") in which the controller 11 generates the voice signal V. The voice synthesis processing is initiated, for example, with an instruction provided by a user of the voice synthesis apparatus 100 acting as a trigger, and is repeated at each predetermined time.

When the voice synthesis processing is started, the controller 11 supplies the first trained model M1 of the specific singer with the control data X, to generate a series of harmonic spectra H (Sa1). The controller 11 also supplies the second trained model M2 of the specific singer with the control data X to generate a time-domain non-harmonic signal A2 (Sa2). Generation of the harmonic spectra H by the first trained model M1 (Sa1) and generation of the non-harmonic signal A2 by the second trained model M2 may be performed in reverse order.

The waveform synthesizer 51 generates a time-domain harmonic signal A1 based on the series of the harmonic spectra H generated by the first trained model M1 (Sa3). Generation of the harmonic signal A1 (Sa3) may be performed between the generation of the harmonic spectra H (Sa1) and the generation of the non-harmonic signal A2 (Sa2). The mixing synthesizer 52 generates a time-domain voice signal V by mixing the harmonic signal A1 generated by the waveform synthesizer 51 and the non-harmonic signal A2 generated by the second trained model M2 (Sa4).

In the first embodiment, as explained above, and a series of harmonic spectra H is generated by the first trained model M1, a time-domain non-harmonic signal A2 for non-harmonic components is generated by the second trained model M2. Thus, in contrast to the technique described in Non-Patent Document 1, in which frequency spectra are generated by a neural network for both harmonic components and non-harmonic components, a natural sounding voice can be generated for both the harmonic components and the non-harmonic components.

In the first embodiment, a harmonic spectrum H is output by the first trained model M1 for each first unit period (each frame), and a sample of the non-harmonic signal A2 is output by the second trained model M2 for each second unit period (each sampling period) that is shorter than the first unit period. Thus, a non-harmonic signal A2, which is difficult to reproduce in the frequency domain, can be generated in the time domain with high acoustic quality. Since only the non-harmonic signal A2 of the voice to be synthesized is generated in the time domain for each second unit period that is relatively short, a required amount of learning and a required number of coefficients are amply less than those in a neural network, such as a Wave Net in which an entire voice to be synthesized is generated. Meanwhile, the harmonic signal A1 of the voice to be synthesized is efficiently generated in the frequency domain for each first unit period. As described above, according to the first embodiment, a voice with high acoustic quality can be efficiently synthesized.

In the first embodiment, the fundamental frequency Y1 corresponding to the harmonic spectrum H output by the first trained model M1 is input to the second trained model M2. Thus, an advantage is obtained in that it is possible to generate non-harmonic components that appropriately follow changes in the fundamental frequency Y1 of the harmonic components. Furthermore, a result (the voiced/unvoiced determination result Y2) of determination as to whether the harmonic signal A1 is voiced or unvoiced is input to the second trained model M2. Accordingly, an advantage is also obtained in that it is possible to generate non-harmonic components that appropriately follow changes from voiced to unvoiced, or vice versa, in the voice to be synthesized.

Second Embodiment

A second embodiment of the present disclosure will now be described. It is of note that in each mode illustrated below, for elements having functions or effects identical to those of the first embodiment, reference signs the same as those used in the descriptions of the first embodiment are used and detailed explanations of such elements are omitted as appropriate.

The second embodiment aims to improve computing efficiency of voice synthesis, using a tendency that non-harmonic components are usually dominant only for a short period in a synthesized voice.

Figure 5:
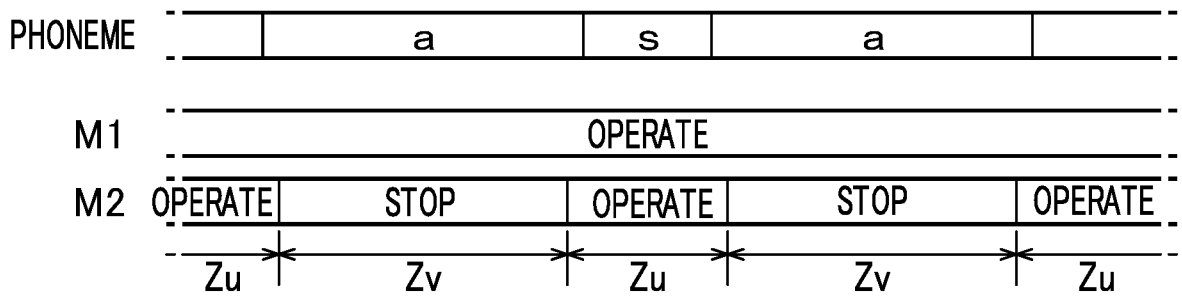
FIG. 5 is an explanatory diagram of an operation of a voice synthesis apparatus in a second embodiment.

While the voice synthesis apparatus 100 in the second embodiment has substantially the same configuration as that in the first embodiment, operation thereof is different from that in the first embodiment. FIG. 5 is an explanatory diagram of an operation of the voice synthesis apparatus 100 in the second embodiment. One or more phoneme corresponding to a phonetic identifier of each note is illustrated in FIG. 5. As illustrated in FIG. 5, the first trained model M1 continuously generates a series of harmonic spectra H regardless of a type (a voiced sound/an unvoiced sound) of each phoneme of the voice to be synthesized.

In FIG. 5, voiced sections Zv and unvoiced sections Zu are shown on a time axis. A voiced section Zv is a section in which the voice to be synthesized is a voiced sound, and an unvoiced section Zu is a section in which the voice to be synthesized is an unvoiced sound. The unvoiced sections Zu may be a section including a phoneme of an unvoiced sound or a section with no sound. There is a tendency for non-harmonic components to be auditorily prominent in the unvoiced section Zu and to be weak relative to harmonic components in the voiced section Zv. In view of such a tendency, the second trained model M2 in the second embodiment generates the non-harmonic signal A2 in the unvoiced sections Zu and stops generation of the non-harmonic signal A2 in the voiced sections Zv, as shown in FIG. 5.

As will be understood from the above explanations, the voice signal V including the harmonic signal A1 and the non-harmonic signal A2 is generated in the unvoiced sections Zu. Thus, an unvoiced sound with a high acoustic quality is generated as the voice to be synthesized. On the other hand, because generation of the non-harmonic signal A2 is stopped in the voiced section Zv, the voice signal V not including the non-harmonic signal A2 is generated. That is, non-harmonic components are not generated in the voiced section Zv. However, because harmonic components are auditorily prominent and hence perceived by listeners in the voiced sections Zv, lack of the non-harmonic components is unlikely to be perceived. The generation of the non-harmonic signal A2 by the second trained model M2 is stopped in the voiced sections Zv. As a result, the second embodiment has an advantage in that a computation amount required for generation of the voice signal V is reduced as compared to the first embodiment in which the non-harmonic signal A2 is generated in both the voiced sections Zv and the unvoiced sections Zu.

Third Embodiment

Figure 6:
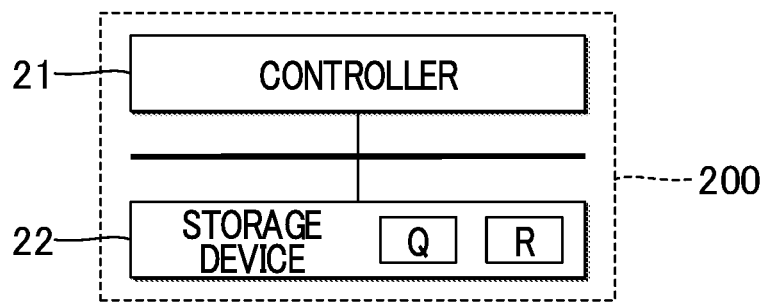
FIG. 6 is a block diagram illustrating a configuration of a trained model generation apparatus according to a third embodiment.

A third embodiment illustrated below is a trained model generation apparatus 200 that generates the first trained model M1 and the second trained model M2 used by the voice synthesis apparatus 100 in the first embodiment or the second embodiment. FIG. 6 is a block diagram illustrating an example of a configuration of the trained model generation apparatus 200 in the third embodiment.

The trained model generation apparatus 200 according to the third embodiment is an information processor configured to establish coefficients K1 that define the first trained model M1 and coefficients K2 that define the second trained model M2 through machine learning. The trained model generation apparatus 200 is realized by a computer system including a controller 21 and a storage device 22 as illustrated in FIG. 6. For example, a portable or stationary information terminal, such as a personal computer, is preferably used as the information processor.

The controller 21 is, for example, processing circuitry, such as a CPU. The storage device 22 is constituted of, for example, a known recording medium such as a magnetic recording medium or a semiconductor recording medium, or a combination of types of recording media, and has stored therein a computer program executed by the controller 21 and various types of data used by the controller 21. The storage device 22 provided separate from the trained model generation apparatus 200 may be configured to enable the controller 21 to write to and read from the storage device 22 via a communication network, such as a mobile communication network or the Internet. That is, the storage device 22 may be omitted from the trained model generation apparatus 200.

The storage device 22 in the third embodiment has stored therein song data Q corresponding to different songs, and voice signals (hereafter, "reference signals") R. Each of the reference signals R is representative of a waveform of a voice (hereafter, "a reference voice") obtained by singing each song. Each reference signal R consists of a series of samples, each sample indicating a signal intensity for each second unit period, and is a time-domain signal representative of a waveform of a reference voice including harmonic components and non-harmonic components. The reference signals R are obtained by recording in advance singing voices of many singers each singing the songs, and are stored in the storage device 22. The phases of the reference signals R stored in the storage device 22 may be converted to a minimum phase. Since diversity in the harmonic spectra H is reduced by using in common the same phase for the reference signals R, an advantage is obtained in that the machine learning by a first learning processor 64 is more efficiently performed as compared to a case in which the phases of the reference signals R are different. While an example is shown in which the song data Q of multiple songs are used such that voices corresponding to various situations can be synthesized, the song data Q of multiple songs are not necessarily used if the song data Q of a single song suffice to cover a requisite range of situations.

Figure 7:
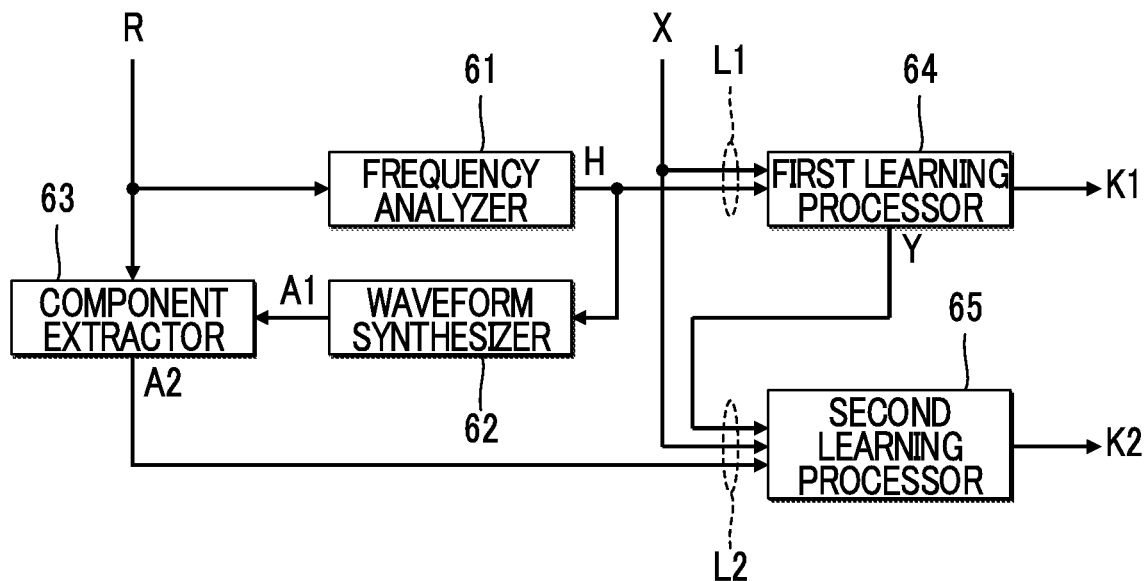
FIG. 7 is a block diagram illustrating a functional configuration of the trained model generation apparatus.

FIG. 7 is a block diagram illustrating an example of a functional configuration of the controller 21. As illustrated in FIG. 7, the controller 21 realizes functions (a frequency analyzer 61, a waveform synthesizer 62, a component extractor 63, the first learning processor 64, and a second learning processor 65) for generating the first trained model M1 and the second trained model M2 upon execution of a computer program stored in the storage device 22. The functions of the controller 21 may be realized by a set of apparatuses (that is, by a system). Alternatively, some or all of the functions of the controller 21 may be realized by dedicated electronic circuitry (for example, by signal processing circuitry).

The frequency analyzer 61 calculates a series of harmonic spectra H for each of the reference signals R corresponding to the song data Q of different songs sung by a specific singer. Each calculated series of harmonic spectra H for each reference signal R is a series of frequency spectra of harmonic components in a reference voice corresponding to the reference signal R. Any known frequency analysis, such as discrete Fourier transform, can be adopted for the calculation of the harmonic spectra H.

The waveform synthesizer 62 generates a time-domain audio signal (hereafter, "harmonic signal") A1 based on each series of the harmonic spectra H calculated by the frequency analyzer 61. A harmonic signal A1 is a time-domain signal representative of a waveform of harmonic components in a reference voice represented by the corresponding reference signal R. The component extractor 63 generates a time-domain non-harmonic signal A2 representative of a waveform of non-harmonic components in the reference voice by subtracting the harmonic signal A1 from the corresponding reference signal R.

As shown in FIG. 7, teacher data L1 including control data X prepared based on song data Q for each song and a series of the harmonic spectra H calculated by the frequency analyzer 61 for the song data Q are sequentially supplied to the first learning processor 64. The series of the harmonic spectra H contained in the teacher data L1 is a series of the harmonic spectra H of a reference voice corresponding to the control data X. More specifically, the teacher data L1 supplied to the first learning processor 64 include control data X for a current first unit period, a harmonic spectrum H for the current first unit period, and a series of the harmonic spectra H for first unit periods immediately preceding the current first unit period.

The first learning processor 64 generates a first trained model M1 for the specific singer through machine learning using the teacher data L1. Specifically, based on teacher data L1, the first learning processor 64 determines, through machine learning, values of coefficients K1 that define the first trained model M1. The machine learning is executed so as to minimize an error between a harmonic spectrum H output by the first trained model M1 supplied with control data X and the series of harmonic spectra H in the teacher data L1 and a harmonic spectrum H for the current first unit period, as a ground truth, in the teacher data L1.

As shown in FIG. 7, teacher data L2 for the specific singer are sequentially supplied to the second learning processor 65. The teacher data L2 include control data X prepared based on the song data Q for each song, auxiliary data Y corresponding to an output of the first trained model M1, and a non-harmonic signal A2 generated by the component extractor 63 for the song data Q for the song. The auxiliary data Y in the teacher data L2 corresponds to the output of the first trained model M1 according to the control data X, and the non-harmonic signal A2 in the teacher data L2 is a non-harmonic signal A2 of a reference voice corresponding to the control data X in the teacher data L2. More specifically, in the teacher data L2, the non-harmonic signal A2 is a series of samples of the non-harmonic signals A2 for second unit periods including a current second unit period and second unit periods immediately preceding the current second unit period; and the control data X is for a first unit period including the current second unit period. The auxiliary data Y corresponds to an output of the first trained model M1 for the first unit period.

The second learning processor 65 generates a second trained model M2 of the specific singer through machine learning using the teacher data L2. The auxiliary data Y include, for example, a fundamental frequency Y1 and a voiced/unvoiced determination result Y2 of the reference voice, similarly to the first embodiment. Specifically, the second learning processor 65 determines, through machine learning, values of coefficients K2 that define the second trained model M2. The machine learning is executed so as to minimize an error between a non-harmonic signal A2 output by the second trained model M2 according to the control data X, the auxiliary data Y, and the series of non-harmonic signals A2 for second unit periods immediately preceding a current second unit period, in the teacher data L2, and a non-harmonic signal A2 for the current second unit period, as a ground truth, in the teacher data L2.

The coefficients K1 (the first trained model M1) established by the first learning processor 64, and the coefficients K2 (the second trained model M2) established by the second learning processor 65 are stored in the storage device 22. The coefficients K1 and the coefficients K2 stored in the storage device 22 are transferred from the trained model generation apparatus 200 to the voice synthesis apparatus 100 and are stored in the storage device 12. That is, the first trained model M1 (the coefficients K1) and the second trained model M2 (the coefficients K2) of the specific singer, which are generated by the trained model generation apparatus 200, are used for the generation of the voice signal V by the voice synthesis apparatus 100.

Figure 8:
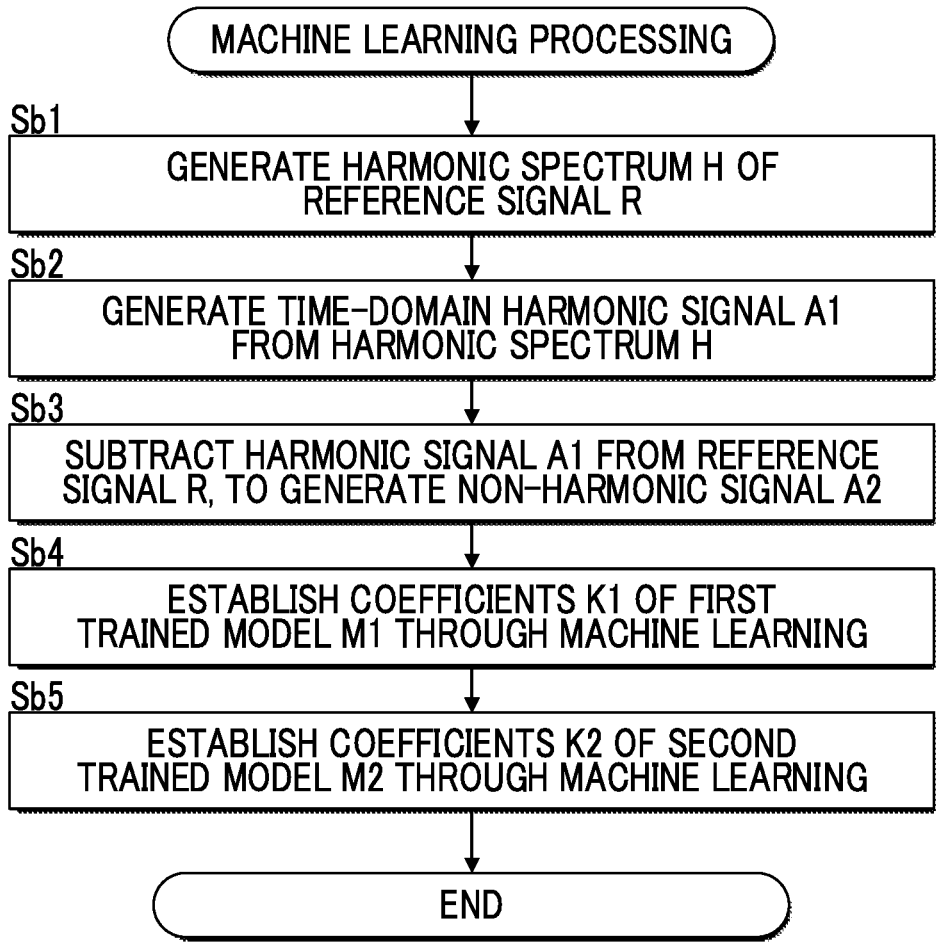
FIG. 8 is a flowchart of machine learning processing.

FIG. 8 is a flowchart of processing (hereafter, "machine learning processing") in which the controller 21 generates the first trained model M1 and the second trained model M2 of the specific singer. The machine learning processing is initiated, for example, with an instruction made by a user of the trained model generation apparatus 200 acting as a trigger, and is repeated at predetermined intervals.

When the machine learning processing is started, the frequency analyzer 61 calculates a series of the harmonic spectra H for each of the reference signals R of the specific singer, the reference signals R corresponding to different songs of the song data Q (Sb1). The waveform synthesizer 62 generates a time-domain harmonic signal A1 based on the series of the harmonic spectra H of each reference signal R (Sb2), and the component extractor 63 generates a time-domain non-harmonic signal A2 of the reference signal R by subtracting the harmonic signal A1 from the reference signal R (Sb3).

The first learning processor 64 establishes coefficients K1 of the first trained model M1 through machine learning on the song data Q for different songs, using the teacher data L1 that contain control data X and a series of the harmonic spectra H corresponding to the song data Q of each of the songs (Sb4). The second learning processor 65 establishes coefficients K2 of the second trained model M2 through machine learning on the song data Q for the songs, using the teacher data L2 that contain control data X, auxiliary data Y, and a non-harmonic signal A2 corresponding to the song data Q of each of the songs (Sb5).

Modifications

Specific modifications added to each of the aspects described above are described below. Two or more modes selected from the following descriptions may be combined with one another as appropriate within a range where no mutual contradiction is caused.

(1) In each of the embodiments described above, a series of the harmonic spectra H is converted to a time-domain harmonic signal A1 and is mixed with a non-harmonic signal A2. However, a configuration to mix the harmonic components and the non-harmonic components in the time domain is not essential. For example, the non-harmonic signal A2 generated by the second trained model M2 may be converted to frequency spectra (hereafter, "non-harmonic spectra") to mix (for example, add) the harmonic spectra H and the non-harmonic spectra, which are then converted to a time-domain voice signal V. As will be understood from the above explanations, the synthesis processor 50 is comprehensively expressed as an element that generates a voice signal V including harmonic components and non-harmonic components based on a series of harmonic spectra H and a non-harmonic signal A2, and the respective processes in the synthesis of the voice signal V may be performed either in the frequency domain or in the time domain.

(2) In each of the embodiments described above, the auxiliary data Y corresponding to a processing result of the first trained model M1 are input to the second trained model M2 for the primary purpose of synchronizing output from the first trained model M1 and output from the second trained model M2. However, the configuration in which the second trained model M2 uses the auxiliary data Y may be omitted, for example, by inclusion of data for synchronizing the output from both the trained models in the control data X. Only one of the fundamental frequency Y1 and the voiced/unvoiced determination result Y2 of the harmonic components may be input to the second trained model M2 along with the control data X.

(3) In the second embodiment, the generation of the non-harmonic signal A2 by the second trained model M2 is stopped in the voiced section Zv. However, the configuration to switch the operation of the second trained model M2 between the voiced section Zv and the unvoiced section Zu is not limited to the example described above. For example, the bit-length of each sample of the non-harmonic signal A2 generated in the voiced section Zv may be set shorter than that in each sample of the non-harmonic signal A2 generated in the unvoiced section Zu. That is, the resolution of a sample of the non-harmonic signal A2 in the voiced section Zv can be reduced as compared to that in the unvoiced section Zu.

(4) In each of the embodiments described above, a virtual singing voice by a specific singer is synthesized. However, a virtual singing voice by any singer selected from singers may be synthesized. Specifically, the first trained model M1 and the second trained model M2 are stored in the storage device 12 for each of the singers. The controller 11 generates a voice signal V in substantially the same manner to that described in the embodiments above, using the first trained model M1 and the second trained model M2 stored in the storage device 12 for, for example, a singer selected by a user from among the singers. That is, the voice signal V is generated to be representative of the synthesis voice of virtual singing by a singer selected from among candidate singers by the user.

(5) The functions of the voice synthesis apparatus 100 illustrated in the first embodiment and the second embodiment and the functions of the trained model generation apparatus 200 illustrated in the third embodiment may be realized by a single apparatus.

(6) The voice synthesis apparatus 100 and the trained model generation apparatus 200 according to the embodiments described above are realized by coordination between a computer (specifically, the controller 11 or the controller 21) and a computer program as described in the embodiments. The computer program according to each of the embodiments described above may be provided in a form readable by a computer and stored in a recording medium, and installed in the computer. The recording medium is, for example, a non-transitory recording medium. While an optical recording medium (an optical disk) such as a CD-ROM (Compact disk read-only memory) is a preferred example of a recording medium, the recording medium may also include a recording medium of any known form, such as a semiconductor recording medium or a magnetic recording medium. The non-transitory recording medium includes any recording medium except for a transitory, propagating signal, and does not exclude a volatile recording medium. The computer program may be provided to a computer in a form of distribution via a communication network. The subject that executes the computer program is not limited to a CPU and a processor for a neural network, such as a tensor processing unit and a neural engine, or a DSP (Digital Signal Processor) for signal processing may execute the computer program. Plural types of subjects selected from the above examples may cooperate to execute the computer program.

(7) The trained model (each of the first trained model M1 and the second trained model M2) is a statistical model (for example, a neural network) realized by a controller (an example of a computer) and generates output B according to input A. Specifically, the trained model is realized by a combination of a computer program (for example, a program module constituting artificial-intelligence software) that causes the controller to perform an operation for identifying the output B from the input A, and coefficients applied to the operation. The coefficients of the trained model are optimized by prior machine learning (deep learning), using teacher data in which input A and output B are associated with each other. That is, a trained model is a statistical model having learned relations between input A and output B. The controller performs, on an unknown input A, the operation to which the trained coefficients and a predetermined response function are applied, thereby generating output B adequate for the input A in accordance with a tendency (relations between input A and output B) extracted from the teacher data.

(8) The following configurations, for example, are derivable from the embodiments described above.

A voice synthesis method according to a preferred aspect (a first aspect) of the present disclosure is a method implemented by a computer and includes: supplying a first trained model with control data including indication of phonetic identifiers to generate a series of frequency spectra of harmonic components; supplying a second trained model with the control data to generate a waveform signal representative of non-harmonic components; and generating a voice signal including the harmonic components and the non-harmonic components based on the series of frequency spectra and the waveform signal. In this aspect, while a series of frequency spectra of harmonic components is generated by the first trained model, a time-domain waveform signal for non-harmonic components is generated by the second trained model. Thus, in contrast to the technique described in Non-Patent Document 1, in which frequency spectra are generated by a neural network for both harmonic components and non-harmonic components, a natural sounding voice can be generated for both the harmonic components and the non-harmonic components.

In a preferred example (a second aspect) of the first aspect, the first trained model is a neural network configured to output a frequency spectrum of the harmonic components for each first unit period, and the second trained model is a neural network configured to output a time-domain sample of the non-harmonic components, for each second unit period that is shorter than the first unit period. In this aspect, while a frequency spectrum of the harmonic components is output by the first trained model for each first unit period, a sample of the non-harmonic components is output by the second trained model, for each second unit period that is shorter than the first unit period. Therefore, an advantage is obtained in that non-harmonic components with a higher acoustic quality can be generated compared to a configuration in which a sample of non-harmonic components is generated for each period that is equal to or longer than the first unit period.

In a preferred example (a third aspect) of the first aspect or the second aspect, in generating the series of frequency spectra of the harmonic components, the first trained model is configured to generate a frequency spectrum of the harmonic components at each time point on a time axis, based on the control data and a series of frequency spectra of the harmonic components generated by the first trained model at time points just before each time point.

Further, in a preferred example (a fourth aspect) of any of the first to third aspects, in generating the waveform signal representative of the non-harmonic components, the second trained model is configured to generate a time-domain sample of the non-harmonic components at each time point on a time axis, based on the control data and samples of the non-harmonic components generated by the second trained model at time points just before each time point.

In a preferred example (a fifth aspect) of the first to fourth aspects, the second trained model is supplied with a fundamental frequency corresponding to a frequency spectrum of the series of the frequency spectra output by the first trained model. In this aspect, a fundamental frequency corresponding to a frequency spectrum of a harmonic component output by the first trained model is input to the second trained model. Thus, an advantage is obtained in that it is possible to generate non-harmonic components that appropriately follow changes in the fundamental frequency of the harmonic components.

In a preferred example (a sixth aspect) of any of the first to fifth aspects, voiced/unvoiced determination is made based on the series of frequency spectra output by the first trained model, and the second trained model is supplied with a result of the voiced/unvoiced determination. In this aspect, since the result of the voiced/unvoiced determination on harmonic components is input to the second trained model, an advantage is obtained in that it is possible to generate non-harmonic components that appropriately follow changes from voiced to unvoiced, or vice versa, in the voice to be synthesized.

A voice synthesis apparatus according to a preferred aspect (a seventh aspect) of the present disclosure includes: a first trained model configured to generate a series of frequency spectra of harmonic components according to control data including indication of phonetic identifiers; a second trained model configured to generate a waveform signal representative of non-harmonic components according to the control data; and a synthesis processor configured to generate a voice signal including the harmonic components and the non-harmonic components based on the series of frequency spectra and the waveform signal. In this aspect, while a series of frequency spectra of harmonic components is generated by the first trained model, a time-domain waveform signal for non-harmonic components is generated by the second trained model. Thus, it is possible to generate a natural sounding voice for both the harmonic components and the non-harmonic components in contrast to the technique described in Non-Patent Document 1, in which frequency spectra are generated by a neural network for both harmonic components and non-harmonic components.

A computer program according to a preferred embodiment (an eighth aspect) of the present disclosure causes a computer to function as: a first trained model configured to generate a series of frequency spectra of harmonic components according to control data including indication of phonetic identifiers; a second trained model configured to generate a waveform signal representative of non-harmonic components according to the control data; and a synthesis processor configured to generate a voice signal including the harmonic components and the non-harmonic components based on the series of frequency spectra and the waveform signal. In this aspect, while a series of frequency spectra of harmonic components is generated by the first trained model, a time-domain waveform signal for non-harmonic components is generated by the second trained model. Thus, it is possible to generate a natural sounding voice for both the harmonic components and the non-harmonic components in contrast to the technique described in Non-Patent Document 1, in which frequency spectra are generated by a neural network for both harmonic components and non-harmonic components.

DESCRIPTION OF REFERENCE SIGNS

100 . . . voice synthesis apparatus, 200 . . . trained model generation apparatus, 11, 21 . . . controller, 12, 22 . . . storage device, 13 . . . sound outputter, 50 . . . synthesis processor, 51 . . . waveform synthesizer, 52 . . . mixing processor, 61 . . . frequency analyzer, 62 . . . waveform synthesizer, 63 . . . component extractor, 64 . . . first learning processor, 65 . . . second learning processor, M1 . . . first trained model, M2 . . . second trained model.

What is claimed is:

1. A computer-implemented voice synthesis method comprising:
   generating, by a first trained model having been trained through machine learning, a series of frequency spectra of harmonic components according to control data including phonetic identifier data;
   generating, by a second trained model having been trained through machine learning, a time-domain waveform signal representative of non-harmonic components according to the control data; and
   generating a voice signal including the harmonic components and the non-harmonic components based on (i) the series of frequency spectra of the harmonic components generated by the first trained model and (ii) the time-domain waveform signal representative of the non-harmonic components generated by the second trained model.

2. The computer-implemented voice synthesis method according to claim 1, wherein:
   the series of frequency spectra of the harmonic components is generated for a series of first unit periods,
   the time-domain waveform signal includes a series of samples of non-harmonic components that are generated for second unit periods, each of the second unit periods being shorter than the first unit period,
   the first trained model is a neural network configured to output a frequency spectrum of the harmonic components for each of the first unit periods, and
   the second trained model is a neural network configured to output a time-domain sample of the non-harmonic components for each of the second unit periods.

3. The computer-implemented voice synthesis method according to claim 1,
   wherein, in generating the series of frequency spectra of the harmonic components, the first trained model is configured to generate a frequency spectrum of the harmonic components at each control time point on a time axis based on (i) the control data and (ii) a series of frequency spectra of harmonic components generated by the first trained model at time points before each control time point.

4. The computer-implemented voice synthesis method according to claim 1,
   wherein, in generating the time-domain waveform signal representative of the non-harmonic components, the second trained model is configured to generate a time-domain sample of non-harmonic components at each control time point on a time axis based on (i) the control data and (ii) samples of non-harmonic components generated by the second trained model at time points before each control time point.

5. The computer-implemented voice synthesis method according to claim 1,
   further comprising supplying the second trained model with a fundamental frequency corresponding to a frequency spectrum of the series of the frequency spectra of the harmonic components generated by the first trained model.

6. The computer-implemented voice synthesis method according to claim 1, further comprising:
   making a voiced/unvoiced determination based on the series of frequency spectra of the harmonic components generated by the first trained model; and
   supplying the second trained model with a result of the voiced/unvoiced determination.

7. The computer-implemented voice synthesis method according to claim 1, further comprising generating a time-domain audio signal based on the series of frequency spectra of harmonic components generated by the first trained model,
   wherein the voice signal including the harmonic components and the non-harmonic components is generated using the time-domain audio signal generated based on the series of frequency spectra of harmonic components and the time-domain waveform signal representative of the non-harmonic components.

8. The computer-implemented voice synthesis method according to claim 1, further comprising:
   outputting, by the first trained model, a fundamental frequency corresponding to a frequency spectrum of the series of the frequency spectra of the harmonic components generated by the first trained model;
   receiving, by the second trained model, the fundamental frequency output by the first trained model,
   wherein the second trained model generates the time-domain waveform signal representative of non-harmonic components based on the control data and the fundamental frequency output by the first trained model.

9. A voice synthesis apparatus comprising:
   a first trained model having been trained through machine learning and being configured to generate a series of frequency spectra of harmonic components according to control data including phonetic identifier data;
   a second trained model having been trained through machine learning and being configured to generate a time-domain waveform signal representative of non-harmonic components according to the control data; and a synthesis processor configured to generate a voice signal including the harmonic components and the non-harmonic components based on (i) the series of frequency spectra of the harmonic components generated by the first trained model and (ii) the time-domain waveform signal representative of the non-harmonic components generated by the second trained model.

10. A non-transitory computer-readable recording medium having recorded thereon a computer program for causing a computer to perform a voice synthesis method of:

generating, by a first trained model having been trained through machine learning, a series of frequency spectra of harmonic components according to control data including phonetic identifier data;

generating, by a second trained model having been trained through machine learning, a time-domain waveform signal representative of non-harmonic components according to the control data; and generating a voice signal including the harmonic components and the non-harmonic components based on (i) the series of frequency spectra of the harmonic components generated by the first trained model and (ii) the time-domain waveform signal representative of the non-harmonic components generated by the second trained model.

* * * * *